United States Patent
Bachhuber (10) Patent No.: US 10,858,105 B2
(45) Date of Patent: Dec. 8, 2020

(54) AVOIDING DAZZLING OF PERSONS BY A LIGHT SOURCE

(71) Applicant: DIEHL AEROSPACE GMBH, Ueberlingen (DE)

(72) Inventor: Martin Bachhuber, Altdorf (DE)

(73) Assignee: DIEHL AEROSPACE GMBH, Ueberlingen (DE)

( * ) Notice: Subject to any disclaimer, the term of this patent is extended or adjusted under 35 U.S.C. 154(b) by 0 days.

(21) Appl. No.: 16/716,928

(22) Filed: Dec. 17, 2019

(65) Prior Publication Data
US 2020/0198784 A1 Jun. 25, 2020

(30) Foreign Application Priority Data

Dec. 21, 2018 (DE) .................. 10 2018 010 099

(51) Int. Cl.
*F21V 1/20* (2006.01)
*B64D 11/00* (2006.01)
(Continued)

(52) U.S. Cl.
CPC .......... *B64D 11/00* (2013.01); *B60J 3/04* (2013.01); *B60Q 3/43* (2017.02); *B60Q 3/72* (2017.02);
(Continued)

(58) Field of Classification Search
CPC .......... B64D 11/00; B64D 2203/00; B64D 11/0015; B60Q 3/43; B60Q 3/72; B60J 3/04; F21W 2107/30; F21W 2106/00
(Continued)

(56) References Cited

U.S. PATENT DOCUMENTS

| 10,099,788 B2 | 10/2018 | Lins |
| 2006/0235753 A1 | 10/2006 | Kameyama |

(Continued)

FOREIGN PATENT DOCUMENTS

| DE | 102006015332 A1 | 11/2006 |
| DE | 102006030300 A1 | 1/2008 |

(Continued)

OTHER PUBLICATIONS

IFA, "Blendung-Theoretischer Hintergrund, Informationen des Instituts für Arbeitsschutz der DGUV" (Glare—Theoretical Background, Information of the Institute for Occupational Safety and Health of the German Social Accident Insurance), IFA Institut für Arbeitsschutz der Deutschen Gesetzlichen Unfallversicherung (Institute for Occupational Safety and Health of the German Social Accident Insurance), May 2010, p. 9, table 1, retrieved from "https://www.dguv.de/medien/ ifa/ de/ fac/ strahl/ pdf/ blendung_theorie.pdf" on Oct. 30, 2018).

(Continued)

*Primary Examiner* — Ali Alavi
(74) *Attorney, Agent, or Firm* — Scully Scott Murphy and Presser (57) ABSTRACT

In a method for avoiding dazzling of a person (10) by a light source (6) arranged in an interior (20) of a vehicle (22), wherein the light source (6) during operation emits light (24) within a beam cone (26), a camera (4) is arranged in the interior (20) and oriented such that at least one monitoring section (28) of the beam cone (26), in which the person (10) can enter, is located in the field of view (30) of the camera (4), the camera (4) records a camera image (32), using machine person detection, it is ascertained from the camera image (32) whether at least one part of the person (10) is located within the beam cone (26), in this case, at least the (Continued)

region (18) of the beam cone (26) in which the part of the person (10) is located is switched to glare-free.

9 Claims, 7 Drawing Sheets

(51) Int. Cl.
  *B60Q 3/43* (2017.01)
  *B60J 3/04* (2006.01)
  *B60Q 3/72* (2017.01)
  *F21W 107/30* (2018.01)
  *F21W 106/00* (2018.01)

(52) U.S. Cl.
  CPC ..... *B64D 2203/00* (2013.01); *F21W 2106/00* (2018.01); *F21W 2107/30* (2018.01)

(58) Field of Classification Search
  USPC ......................................................... 362/470
  See application file for complete search history.

(56) References Cited

U.S. PATENT DOCUMENTS

| | | | |
|---|---|---|---|
| 2008/0186701 A1 | 8/2008 | Omi | |
| 2011/0163697 A1* | 7/2011 | Mizukami | B60Q 3/43 315/324 |
| 2014/0313751 A1* | 10/2014 | Abel | B60Q 3/47 362/464 |
| 2016/0174335 A1 | 6/2016 | Park | |

FOREIGN PATENT DOCUMENTS

| | | |
|---|---|---|
| DE | 102008006973 A1 | 10/2008 |
| DE | 102013223145 A1 | 5/2015 |
| DE | 102015215371 A1 | 6/2016 |
| DE | 102016006703 A1 | 12/2017 |

OTHER PUBLICATIONS

Akaze and Orb planar tracking Sep. 4, 2016, retrieved on Nov. 7, 2017 at https://gregorkovalcik.github.io/opencv_contrib/tutorial_akaze_tracking.html.

Alcantarilla, P. F. et al., (Oct. 2012), Kaze Features, retrieved on Oct. 24, 2017 at http://robesafe.com/personal/pablo.alcantarilla/kaze.html.

Stauffer, Chris et al., (1999), "Adaptive background mixture models for real-time tracking", The Artificial Intelligence Laboratory, Massachusetts Institute of Technology, Cambridge, MA.

Erhardt, A. (2008), Einführung in die Digitale Bildverarbeitung, Vieweg+Teubner, cited in the specification on p. 18.

How to Use Background Subtraction Methods Nov. 7, 2017, retrieved on Nov. 8, 2017 at https://docs.opencv.org/master/d1/dc5/tutorial_background_subtraction.html.

Kunz, D. (2016), Institut für Medien- und Phototechnik, Bildverarbeitung SS 2016 chapter 20, TH Köln.

Kunz, D. (2016), Institut für Medien- und Phototechnik, Bildverarbeitung SS 2016 chapter 5, TH Köln.

Laws, K. I. (1980), "Rapid Texture Identification", SPIE, vol. 238, Image Processing for Missile Guidance, pp. 376-380.

Melton, B. (2015), Presentation on theme: Segmentation Using Texture, retrieved on Nov. 22, 2017 at http://slideplayer.com/slide/6920161.

Viola, P. et al. (2001), Rapid Object Detection using a Boosted Cascade of Simple Features, Accepted Conference on Computer Vision and Pattern Recognition 2001, Cambridge, MA.

\* cited by examiner

(Prior art)

AVOIDING DAZZLING OF PERSONS BY A LIGHT SOURCE

BACKGROUND OF THE INVENTION

The invention relates to dazzling of a person by a light source, wherein the light source is arranged in an interior of a vehicle.

DISCUSSION OF THE PRIOR ART

DE 10 2016 006 703 A1 discloses a projector for producing a light projection in an interior of an aircraft as a vehicle, in particular in the passenger cabin as an interior. It is to be avoided in practice that persons, e.g. passengers in a corresponding aircraft, are dazzled by light emitted by the projector.

SUMMARY OF THE INVENTION

The present invention is directed to improving the situation with such light sources. More particularly, the present invention is directed to a method serving to avoid a person being dazzled by a light source. The light source is arranged in an interior of a vehicle, wherein the light source during operation emits light within a beam cone. In the method, a camera is arranged in the interior and oriented such that at least one monitoring section, that is to say a part, of the beam cone into which the or a person can or could enter lies within the field of view of the camera.

The camera then records a camera image. Using machine person detection, it is then ascertained from the camera image whether at least one part of the person is located within the beam cone or in the monitoring section. If at least the part of the person is located within the beam cone or monitoring section, at least the region of the beam cone in which the part of the person is located is switched to glare-free.

The method relates to persons that are located in the interior of the vehicle and can potentially enter the beam cone and thus run the risk of being dazzled by the light source. The light source is in particular a projector. The light source is in particular installed in the interior.

The beam cone describes the spatial region within which the light source can potentially emit light. Depending on the light source and the operating state, a possible actual emission of light then takes place entirely or partially within the beam cone. A "cone" is here understood to mean, in a broad mathematical sense, a body having a base area of any desired shape, wherein the cone here in particular has a rectangular base area that corresponds to the maximum image content of a projector as a light source presented on a target area.

It is detected, owing to the method, using machine person detection whether a person is located within the beam cone of the light source and would thus be dazzled during normal operation of the light source. However, actual glare is then avoided by virtue of the beam cone being correspondingly switched to glare-free at least at the location of the person, at least the head thereof, at least the eyes thereof.

"Switching to glare-free" means that the light of the light source is limited in its intensity to a maximum that is no longer perceived as "glare" by the person. It is possible to base this on average perception, for example. A correspondingly reduced degree of brightness can be individually ascertained here, for example by way of tests, estimates, etc., depending on the properties of the light source, the installation situation, the minimum distance of any persons from the light source as intended and so on. The light intensity can here be selected for example in the range of smaller than 3, at most 4, at most 5, at most 6 or at most 7 or at most 8 or at most 9 of the de Boer scale (see inter alia: "Blendung—Theoretischer Hintergrund, Informationen des Instituts für Arbeitsschutz der DGUV" (Glare—Theoretical Background, Information of the Institute for Occupational Safety and Health of the German Social Accident Insurance), IFA Institut für Arbeitsschutz der Deutschen Gesetzlichen Unfallversicherung (Institute for Occupational Safety and Health of the German Social Accident Insurance), May 2010, page 9, table 1, retrieved from "https://www.dguv.de/medien/ifa/de/fac/strahl/pdf/blendung_theorie.pdf" on 30 Oct. 2018).

In one preferred embodiment, the entire beam cone is switched to glare-free when at least part of the person is located within the beam cone. This is particularly simple since the beam cone becomes dazzle-free as a whole, or the light source becomes dazzle-free for the entire beam cone. Selective operation or selective switching-off or blocking of the light source for specific parts of the beam cone is thus avoided.

In a preferred embodiment, the region of the beam cone is switched to glare-free by way of the light source being switched to glare-free or being switched off only for the relevant region. The region is then the region of the person, that is to say for example the outline of said person, the head thereof or the eyes thereof. The brightness of the light source is thus locally reduced to a glare-free degree or set to zero. A corresponding switch of the light source to glare-free can be effected particularly easily.

In a preferred embodiment, the beam cone is aimed at a target area of the interior, and the camera is oriented such that at least a partial region of the target area lies within the field of view of the camera. In particular, the field of view of the camera thus contains at least a partial region of the target area and in particular also a residual portion that does not image the target area. The beam cone of the light source terminates at the target area. Many situations in which persons can be potentially located on purpose more in the region of the target area than in the region of the light source, and are therefore at risk from glare, are conceivable in practice. Such situations can be particularly efficiently managed with the present embodiment.

The target area is in particular a bin in a passenger cabin of an aircraft. Said bin is generally located at head level of adults of average height. The risk of glare is therefore particularly an issue here.

In a preferred variant of this embodiment, the—in particular entire or whole—partial region of the target area that is captured by the camera is not taken into account in machine vision or in machine person detection. In particular, the entire partial region is not taken into account. Consequently, in particular only the residual part of the camera image that does not correspond to the partial region is evaluated, that is to say in particular a vicinity of the partial region or another region adjacent to the partial region.

In particular, in a further variant, it is not the entire partial region of the target area but only part thereof that is not taken into account; in particular, the partial region is not left out in its entirety, specifically a partial region with persons and/or movements as part of the image content presented on the target area by the light source, in particular a projector. In this way, it is generally—or in this variant purposefully—avoided that persons and/or movements that are part of the image content produced by the light source are incorrectly detected as parts of persons at risk of glare. In particular, it is possible here for the entire target area irradiated by the light source not to be taken into account in machine vision or machine person detection. This is particularly simple to accomplish.

Alternatively, only the parts of the target area on which corresponding image contents are presented are excluded from machine vision or from machine person detection. However, real persons located within the beam cone of the light source can continue to be detected therewith. In other words, the part of a person that is presented here on the target area by the light source is in particular recognized as being part of the image content and the beam cone in this case is not switched to glare-free.

In a preferred embodiment, the camera is oriented such that a vicinity of the beam cone (adjoining the beam cone) also lies in the field of view of the camera. In this way, it is also possible to detect persons as soon as they approach the beam cone. In this way, it is possible to switch the beam cone to glare-free as a precaution before the person enters it. Glare can thus be prevented at any time. It is also possible to extrapolate a person entering the beam cone into said beam cone when the target area is excluded from person detection (for example on account of reproduced image contents etc., see above).

In a preferred embodiment, the camera is placed next to the light source. This installation position for a camera is particularly advantageous because in this way the beam cone and/or possibly also the target area or the part of the target area that is illuminated by the light source is completely or substantially completely capturable by the camera.

In a preferred embodiment, machine vision and/or face detection and/or texture detection and/or movement detection is/are performed as part of the machine person detection. The corresponding methods are particularly suitable for machine person detection.

The present invention is further directed to the use of the machine person detection in a method in accordance with the present invention. The use and at least some of the embodiments thereof and the respective advantages have already been explained analogously in connection with the method according to the invention.

The present invention is based on the following findings, observations or considerations and also includes the following embodiments. The embodiments are in this case also referred to as "the invention", partly for the purposes of simplification. The embodiments may in this case also contain parts or combinations of the abovementioned embodiments or correspond to them and/or possibly also include embodiments which have not yet been mentioned.

The invention is based on the idea of integrating light sources (projectors) in the aircraft cabin to project light (images) onto a target area (the surfaces for example of bins or monuments). In many integration scenarios, it is here not possible to prevent passengers from moving in the light beam of the projector and potentially being dazzled in this way (line of sight situation). In order to nevertheless be able to utilize these integration scenarios without negatively impacting the passenger, the invention proposes a method that switches off or blocks the light beam depending on the situation if a passenger enters the glare region. "Blocking" in this case can in particular also be understood to mean to switch off the light beam locally in the region of the face only in the case of face detection.

The invention is based on the consideration that it should go beyond purely avoiding the glare situation, that is to say by corresponding integration of the projectors.

The invention is based on the idea of achieving the object by using machine vision. In addition to the system projector-target area, a camera which can capture the region of the projected image and the immediate environment thereof is installed to this end. Based on various methods such as face detection, texture detection or movement detection, it is ascertained here whether a person is located in the region that is at risk of glare (in particular in the beam cone). Depending on the method, the entire light source can be deactivated thereupon or the relevant image region that would cause glare can be blocked. It is also possible to take into account the fact that persons or movements existing in the projected image content are not incorrectly detected as a glare situation and result in the light source being switched off.

The advantage of the method is that, using the described method, target areas or projection areas or integration scenarios (generally illumination situations) that would otherwise result in passengers being dazzled can also be used.

The invention has two core aspects: first, the use of computer vision to avoid glare in projection and light systems in the aircraft cabin. Secondly, avoiding erroneous detections, which could occur due to human-like elements in the projected image content.

According to the present invention, a functionality has been developed in the field of projection system control to detect by way of camera whether a person is dazzled by the projector. In the case of glare, the projector is then to be deactivated or the corresponding region in the image is to be blocked. The invention thus describes camera-controlled avoidance of the dazzling of persons.

Further, according to the present invention, the avoidance of the dazzling of passengers is accomplished by machine person detection. Possible dazzling of the passengers by projectors/light sources in the aircraft cabin is avoided or reduced by machine person detection, in particular by machine vision (computer vision).

BRIEF DESCRIPTION OF THE DRAWINGS

Further features, effects and advantages of the invention become apparent from the following description of one preferred exemplary embodiment of the invention and the appended figures. In the figures, in each case in a schematic diagram.

DETAILED DESCRIPTION OF THE INVENTION

According to the present invention, a system detects when a person is located between a projector and the area that is projected by said projector. This is expedient when the intention is to avoid that the person is inconveniently dazzled. Therefore, it is the objective in such a case to switch off the projector, or in other versions to switch off the regions of the projector in which the person is located.

A plurality of approaches are pursued here, which in each case meet the conditions in the aircraft cabin in different ways, because owing to vibrations and changes in brightness, there are many limitations in image processing.

First, the theoretical bases of image processing relating to the various approaches will be discussed. Next, a test setup with the components used and software will be described. Based thereon, five approaches will be discussed, "detecting in the projection", "detecting around the projection" with difference image, feature and structure detection and "detecting using face detection". Finally, the results of the individual approaches will be evaluated.

Basic Principles:

Feature Detection:

The purpose of the feature detection is to re-identify a given image feature in a different image. Re-identification should be independent here of translation, rotation and scaling. Both images are therefore searched for points of interest which are compared to one another such that re-identification is possible.

KAZE

KAZE is an algorithm for feature detection developed by Pablo F. Alcantarilla, Jesus Nuevo and Adrien Bartoli. This algorithm uses the Hessian matrix for detecting the points of interest. Here, a search is performed for positions at which the determinant of the Hessian matrix reaches a local maximum. These points are generally of interest because they contain sufficient structure for them to be re-identified in the comparison image. Furthermore, a scale space is created to make possible a scaling invariance. Scale space means that the output image is filtered multiple times with different filter sizes and consequently the image is present in a plurality of scalings. To ensure re-identification in the comparison image, a description of said points of interest is required. This is accomplished with a 64-dimensional feature vector, which is composed of brightness and gradient information and is invariant with respect to scaling, rotation and translation. Using a search algorithm, a correspondence between output and comparison image is then established. (Alcantarilla, Nuevo, & Bartoli, 2012.

Ransac:

In order to minimize incorrect assignments, the RANSAC method is used. In this case, a random subset is selected from all the assignments and the number of assignments that are consistent with said solution is determined. Once a subset has been found that does not contain outliers, this set is particularly large. (Kunz, Bildverarbeitung SS 2016 chapter 20, 2016).

Difference Image:

In the case of the difference image, pixel-wise subtraction of two images with respect to one another is effected. Grey-level images are necessary herefor.

$$g'(x,y)=g1(x,y)-g2(x,y)$$

with g1(x,y), g2(x,y)=input image and g'(x,y)=output image.

It is possible with this method to discern differences between two images. Since movement in image processing is a change in the grey values, it is also possible to detect movement with this method. So, if g1(x,y) is the image with the person and g2(x,y) is an image without the person, this means that all pixel values that are not zero include a change (Erhardt, 2008). If now a threshold is also established and the newly created output image is binarized, the result is a black-and-white mask that reproduces only the changes.

Since a change in the brightness and movement of the camera also means a change in grey level, this method is not robust with respect to brightness changes and movement of the camera.

Mixture of Gaussian:

To counteract changes in the background image and vibrations, it is possible to render the background model adaptive. OpenCV to this end makes available the extended difference image method "mixture of Gaussian" (MOG). It is based on the paper by Chris Stauffer and W. E. L Grimson (Chris Stauffer, 1999). This method is highly suitable in the case of constant changes in the background due to brightness changes or movements, such as for example in recordings of trees that stir in the wind or the motions of waves in the sea.

In this method, the frequency of the values of each individual pixel from the preceding images is incorporated in the calculation of a background model. These values which have already been recorded are considered to be normally distributed random variables and represented as a Gaussian distribution. The different values of a pixel here receive different Gaussian distributions. The probability of whether a pixel is to be observed is calculated from:

$$P(X_t) = \sum_{i=1}^{K} \omega_{i,t} * \eta(X_t, \mu_{i,t}, \Sigma_{i,t})$$

Here, K is the number of distributions, $\omega_i$ is the weighting and $\eta(X, \mu i, t, \Sigma i, t)$ is the Gaussian probability density function. New pixel values are then permanently compared to the Gaussian distributions until a hit is found. A hit is defined as a pixel value within the standard deviation of 2.5. If no hit is found, the lowest fitting distribution is replaced by the current distribution and adapted to the weighting. In this way, changes, such as light or vibrations, can be incorporated in the background model.

In order to classify whether a pixel belongs to the foreground or the background image, the Gaussian distributions are sorted by their probabilities. The distributions with great probability that lie above a threshold value are considered to be background, and those that lie below it are considered to be foreground.

Image Textures:

A suitable basis for detecting structures is "Laws Texture Energy Measurement" (Laws, 1980). It was developed with the aim of analysing the structure in images and indicating how much energy it contains. Here, the image is convolved with a 5×5 convolution mask to highlight structures. The following convolution formula is used for the convolution of an image:

$$b_{kl} = \sum_{i=-\infty}^{\infty} \sum_{j=\infty}^{\infty} a_{ij} h_{i-k, j-l}$$

In concrete terms convolution means that each point k, is targeted in the input image with a convolution mask. At each point within the mask, the product is formed, added up and subsequently written in the output image at the location k.

The convolution mask used by Laws is calculated from different vectors that can be combined in each case for corresponding image contents.

L5 (Level)=[1 4 6 4 1]

E5 (Edge)=[−1 −2 0 2 1]

S5 (Spot)=[−1 0 2 0 −1]

R5 (Ripple)=[1 −4 6 −4 1]

The L5 vector calculates the local average, E5 detects edges, S5 detects spots and R5 is suitable for wave-type structures. When forming the product from two of these vectors, the result is a two-dimensional convolution mask that convolves an output image according to the respective vector properties, and, after subsequent binarization, a binary image showing only the structures in the image is obtained.

Face Detection:

In face detection, digital images are analysed for different features to detect faces. One of the most common methods is OpenCV implementation based on pattern recognition with training data, described in "Rapid Object Detection using a Boosted Cascade of Simple Features" published by Paul Viola and Michael Jones (Viola & Jones, 2001). This algorithm permits quick calculation with a low error rate, which means that robust detection is also possible in near-real time.

Figure 1:
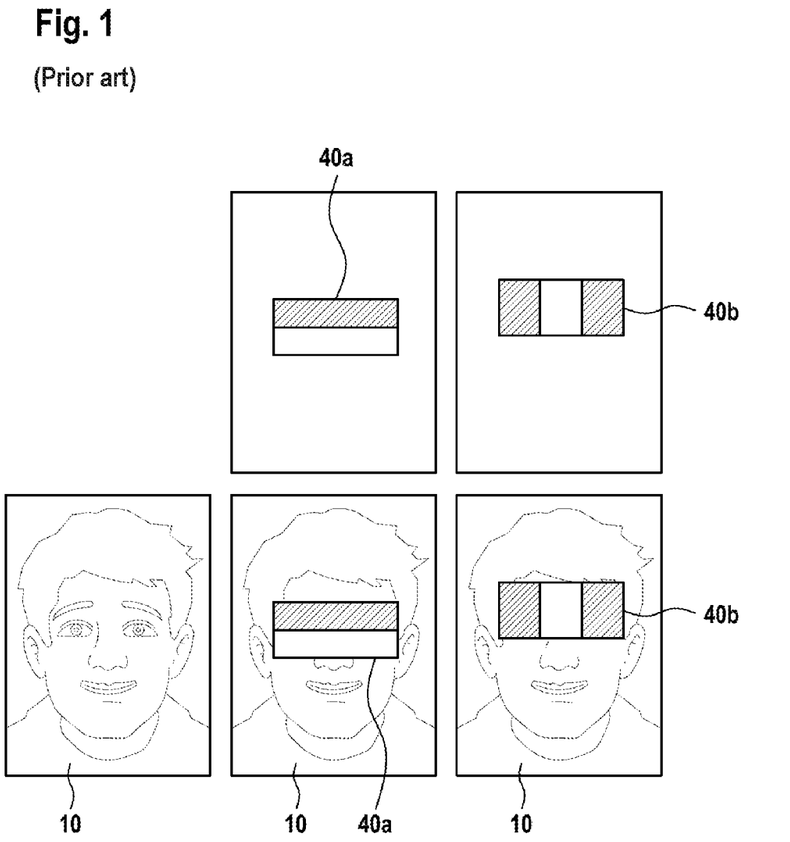
FIG. 1 shows convolution masks according to the prior art (Viola & Jones, 2001)

In pattern recognition for faces according to Viola and Jones, initially training data must be produced. In the course of this, both positive images, that is to say images that show faces, and negative images, i.e. images without faces, are used. For analysis purposes, a convolution with Haar wavelets with different scalings is performed (convolution see 0 image textures). Haar wavelets are simple convolution masks formed from rectangular functions, see convolution masks 40a,b (Viola & Jones, 2001) in FIG. 1 as used in an imaged presentation of a person 10. In the convolution, the sum of the black rectangles is subtracted from the sum of the white rectangles in a section of 24×24 pixels. To optimize this procedure, the calculations are performed with a summed area table. In a summed area table, the individual pixel values are added up. It is hereby possible to obtain the sum of the individual sections in only four mathematical operations. In order to find only the useful values from the multiplicity of calculated values, Viola and Jones use the AdaBoost algorithm for machine learning. Here, classifiers are created from positive and negative images and the features calculated therein. In the extended adaptive method, simple classifiers are furthermore combined into one.

Figure 2:
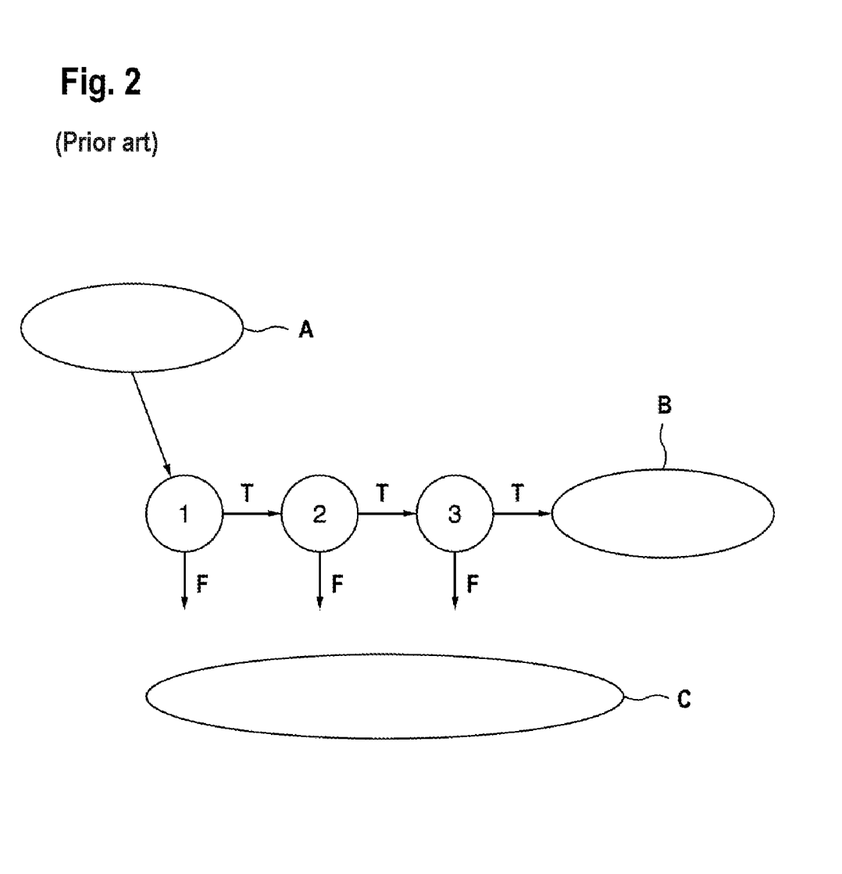
FIG. 2 shows a cascade of the classifiers according to the prior art (Viola & Jones, 2001)

It is then possible to detect faces using the training data that have been generated. To this end, the image section runs through a cascade of classifiers that decide, on the basis of the calculated feature data, whether this is a negative image ("F") or a positive image ("T"). FIG. 2 shows a cascade ("1", "2", "3") of the classifiers (Viola & Jones, 2001) with step A "All Sub-Windows", step B "Further Processing" and step C "Reject Sub-Window".

Test Setup:

Development Environment:

For implementing the system, the programming language C++ is used in the development environment Eclipse. The implementation of the image processing is realized by the framework OpenCV. Tutorials from the documentation of OpenCV form the basis for the AKAZE and difference image method. (Alcantarilla, Nuevo, & Bartoli, 2012) (How to Use Background Subtraction Methods, 2017).

Figure 3:
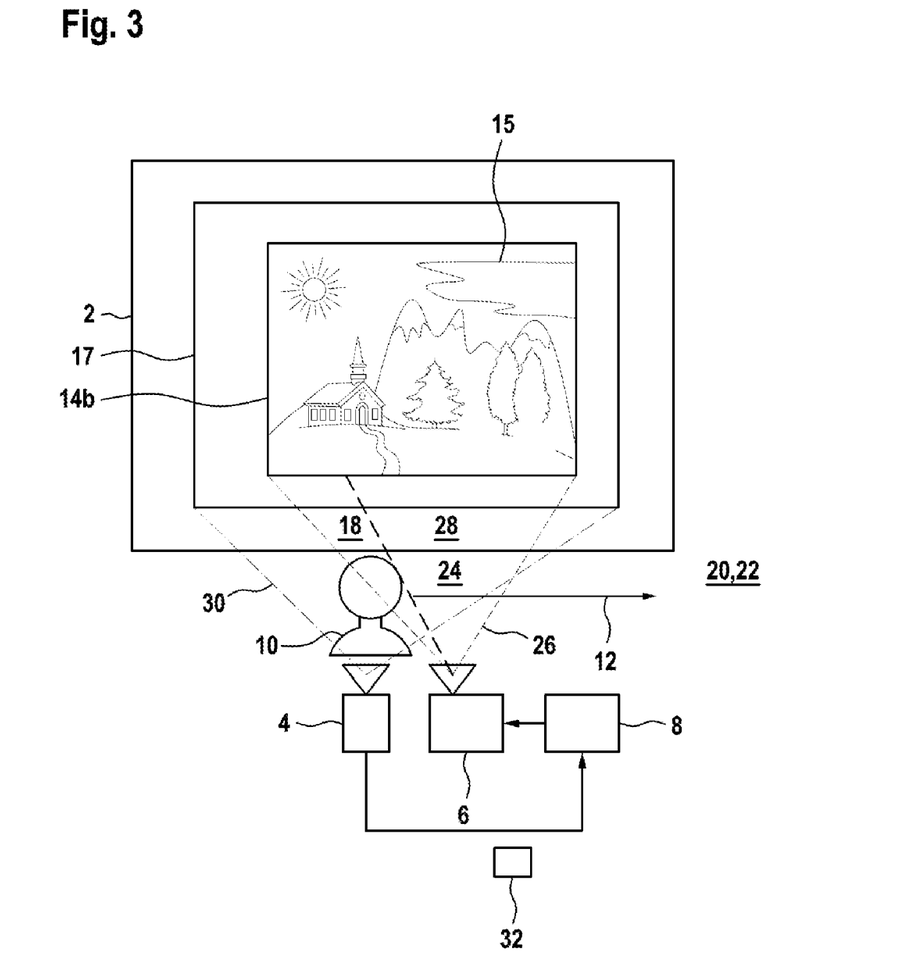
FIG. 3 shows a diagram of a test setup according to the invention.
Figure 4:
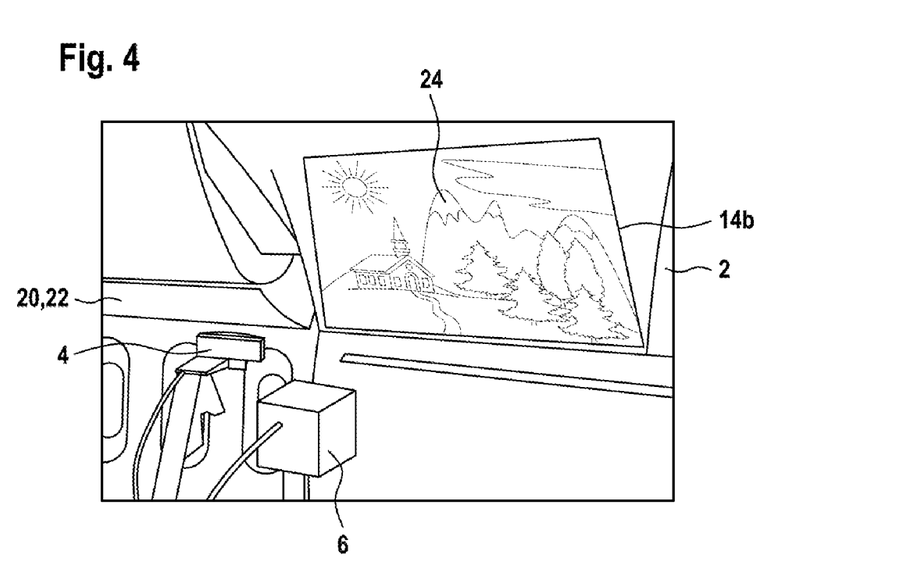
FIG. 4 shows a spatial view of the test setup of FIG. 1.

Setup:

A test setup according to FIG. 3 (schematic) and FIG. 4 (view) is used for testing the system. The figure contains a target area 2, in the present case a projection area on a bin or a panel in an interior 20, in the present case a passenger cabin, of a vehicle 22, in the present case an aircraft. The setup also contains a camera 4 in the form of a webcam, a light source 6 in the form of a projector and a computer 8, in the present case a notebook. The camera 4 is arranged next to the light source 6 or the projector. The projector produces light 24 within a beam cone 26 and thereby the image 14b (projected onto the target area 2). Said image exhibits a specific image content 15, in the present case a landscape with sky. The camera 4 captures the image 14b produced (or the entire beam cone 26 that is incident on the target area 2) and a vicinity 17, that is to say an additional, larger evaluation region. The camera 4 thereby captures in its field of view 30 a monitoring section 28 of the beam cone 26. The camera 4 in this respect records a camera image 32.

The computer 8 controls the projector and produces the video signal and evaluates the camera image 32 using machine person detection to determine whether a person 10 or part of said person is located in the beam cone 26. Test devices are the LED projector Optoma ML750ST and the webcam Logitech C920. These are raised to be level with a bin (target area 2) in a test arrangement using two stands and directed at it. It is important to note here that the autofocus of the camera is deactivated. During the development phase, videos are recorded for testing purposes. Here (indicated by arrow 12), a person 10 passes through the projection and, during that time, the projector 6 is switched off and on again (entirely or locally) or switched to glare-free. When testing the system, the projector 6 as an extended screen and the webcam 4 are connected to a laptop (computer 8), on which the programming code is executed. The window produced by OpenCV is opened in full-frame mode on the extended screen for the contents that are to be presented on the projector 6.

Upon detection of a part of the person 10 in the beam cone 26, the region 18 thereof, in which the part of the person 10 is located, is switched to glare-free, in the present case switched off. Rather than the image 14a, a "black" image content of the brightness zero is reproduced in the corresponding region 18.

Solution Approaches:

Approach 1: Detecting within the Projected Image

Figure 5:
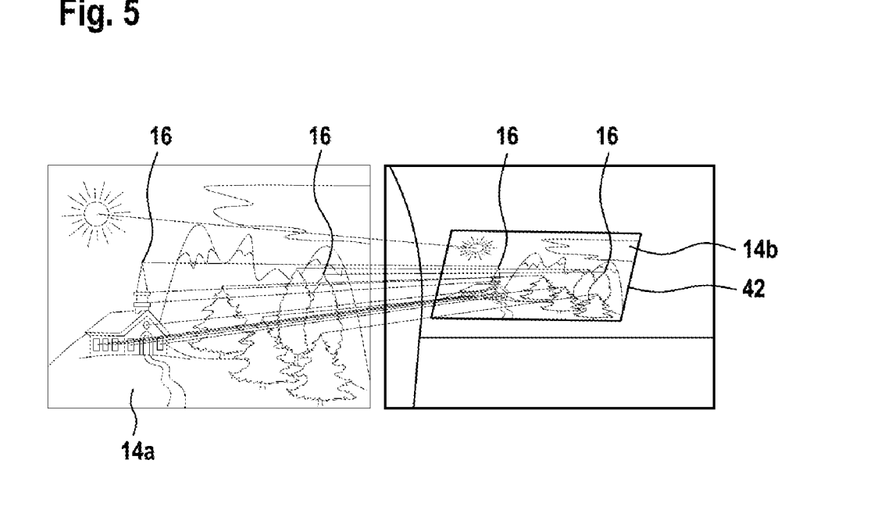
FIG. 5 shows an illustration of matches.

In this approach, the detection of a person in the projection is to take place, specifically not when the person can be seen in the camera image but upon entry in the projection. To trigger the detection, matches are to be found between the projected image through the camera and the digitally available image by way of the AKAZE feature descriptor and detector. FIG. 5 shows the digitally available image 14a and the projected image 14b, and also features 16 (indicated by circles) of the image content 15, here the landscape with sky, which are matched on the basis of arrows.

Figure 6:
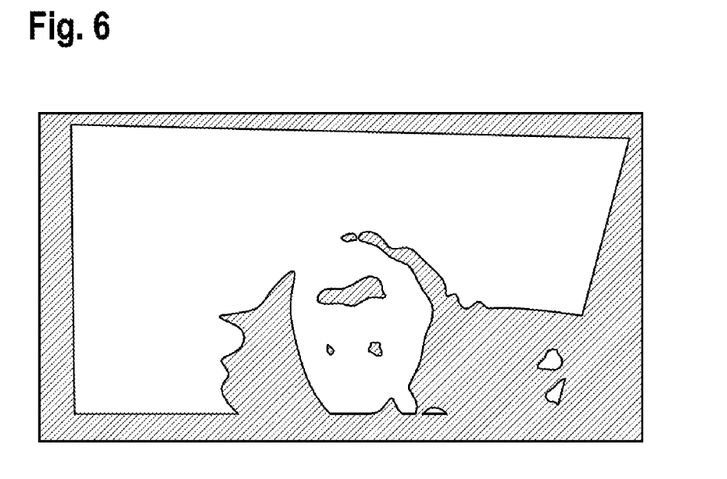
FIG. 6 shows a difference image in projection.

To use the AKAZE method, a threshold value with the number of matches must be set in the beginning. If a person then enters the projection, the number of the matching features falls below the threshold value and the projector is switched off. Since no image is now available for comparison purposes, a check is performed using the difference image method as to whether the person is still located in the projection. FIG. 6 shows a difference image in the projection. Since the image is black when no person is located in the image, the average of the difference image is simply calculated and, if it increases, there is movement. The background image for generating the difference image is created directly after the start of the application with a switched-off projector. Since the image section of the webcam extends beyond the projected area, it is additionally necessary to create a mask such that only the projection is taken into account and not the region outside of it. This mask is created using the frame 42 in FIG. 5 of the AKAZE feature comparison. When the person leaves said region, the projection is activated again and the feature comparison mode is activated again.

Approach 2: Detecting Outside of the Projected Image

In this approach, an attempt is made to detect the person outside the projection to deactivate the projector. This has the advantage that the analysis proceeds independently of the projected image content and consequently playback of moving image contents is also possible. This is to be realized using a difference image, feature detection—as an approach 1—and filtering of the image using filter kernels according to "Laws Texture Energy Measurement". To block the image content, it is necessary—exactly as in approach 1—to start by creating a mask using feature detection. However, in this case the aim is to cover the projected image content.

Figure 7:
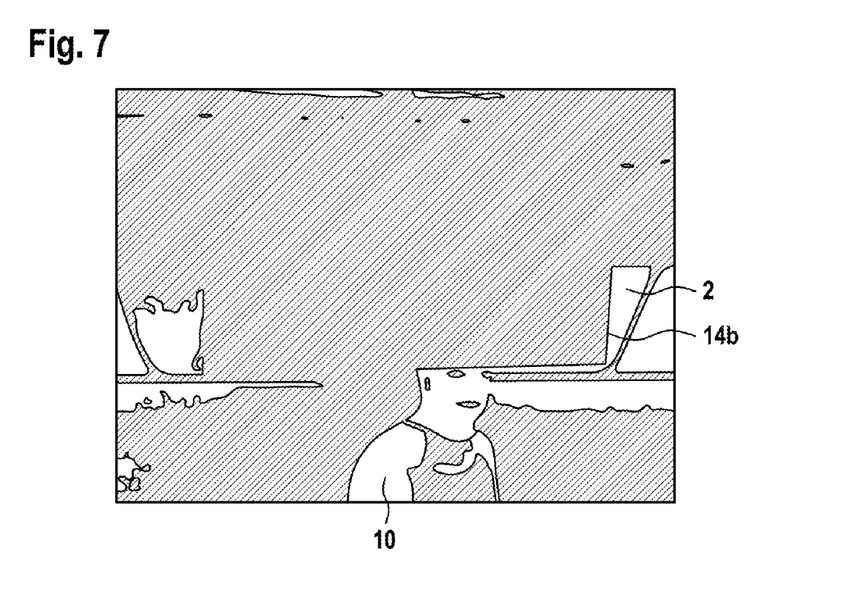
FIG. 7 shows a difference image around projection.
Figure 8:
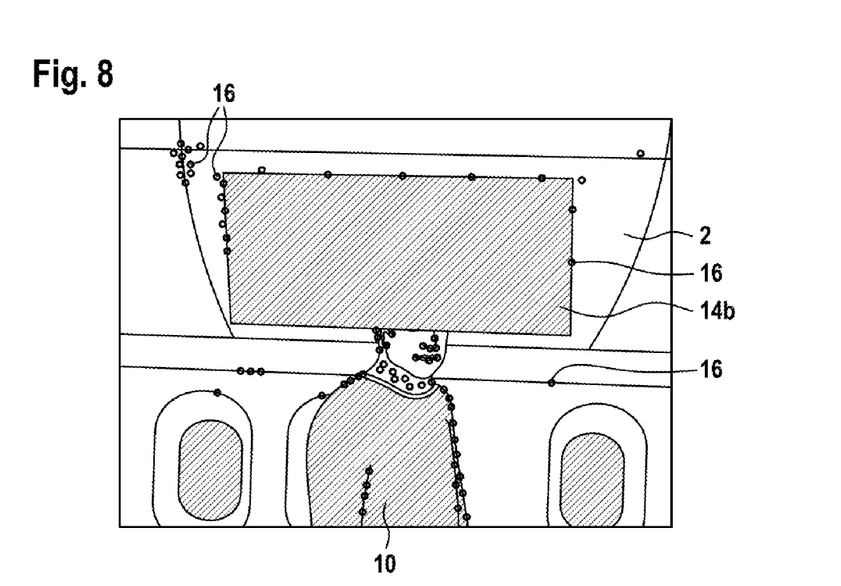
FIG. 8 shows a feature image.
Figure 9:
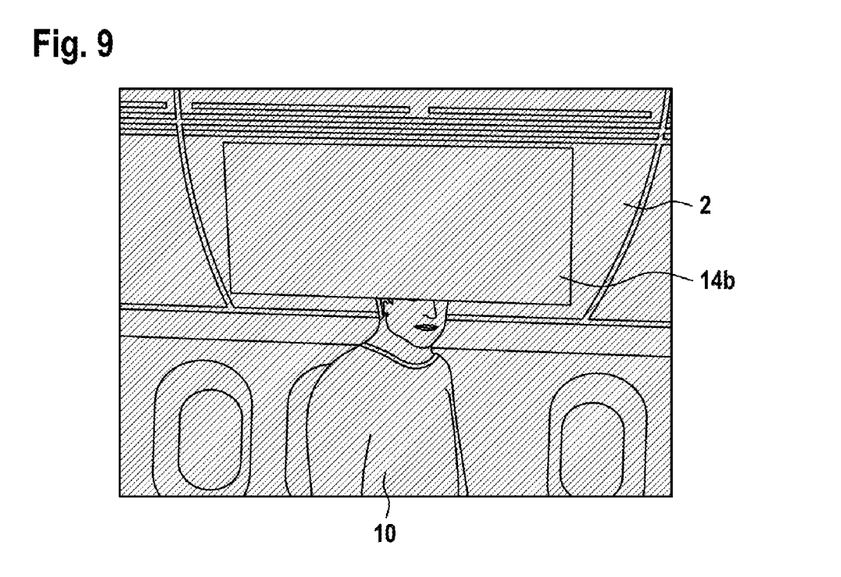
FIG. 9 shows a structure image.
Figure 10:
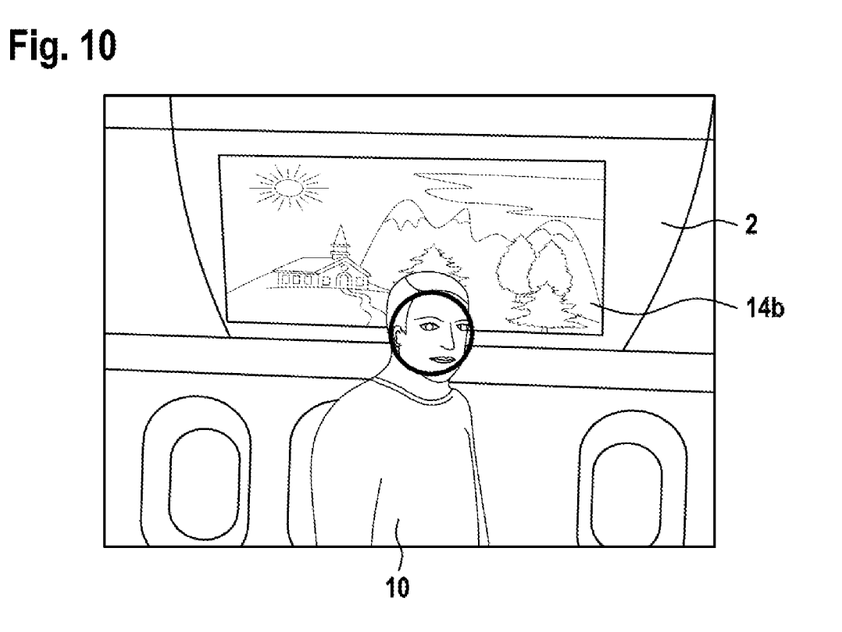
FIG. 10 shows face detection

Difference Image:

First, the empty background image that is to be subtracted from the current camera image must be recorded. This is done after the mask has been created. Since the "mixture of Gaussian" method is applied, a plurality of images are used, as a result of which there is greater robustness with respect to minor fluctuations in the image content. Next, the average of the empty image is calculated so as to set a threshold value for the detection. From now on, the average of the difference image will be continuously calculated. If a person enters the projection, or the frame of the projection, the average of the entire image increases to over the threshold value and the projector is deactivated. This produces a difference image around the projection in accordance with FIG. 7 (difference image method). In this figure, it can also be seen, to the left and to the right of the projection, that the brightness of the overall image is changed by switching off the projection. An attempt is made to compensate this by learning the "mixture of Gaussian" method, which is intended to detect simple brightness changes. If the person leaves the image, the value falls under the threshold and the projector is reactivated.

FIGS. 7 to 10 each show the same camera image 32, assessed/processed using different methods. The person 10 presented is not part of the image content 15 of the image 14b, but is located in the beam cone 26 as an actual person 10.

Features:

This method is based on the AKAZE feature detection used in approach 1. However, in this case the search is for the features outside of the projection. Here, too, a threshold value in the empty image is calculated at the beginning from the number of the features. If a person then enters the camera image, the number of features changes. First, features that were found in the empty image are occluded, and second, more features are detected on account of the person.

Due to this change in features as compared to the threshold value, the projector is deactivated. On account of the fact that the feature detection is relatively robust with respect to changes in brightness, the fluctuation in brightness due to the projector being switched off has no great influence on the number of the features 16. In this regard, see the feature image according to FIG. 8.

Structure:

In structure detection, only the structures in the image are to be highlighted using convolution as per "Laws Texture Energy Measurement" and subsequent binarization. Here, too, an average that is to be used as the threshold value is calculated with the image without a person. If this image is then changed by an entering person, the threshold being exceeded deactivates the projector and, if the value falls below the threshold, the projector is reactivated. See the structure image in FIG. 9 (structure image method).

Approach 3: Face Detection:

Using face detection, the exact position of the person is to be detected and thus, in contrast to the other approaches, it is not the entire projector that is deactivated but only the region in which the face of the person is located. This is to be realized using the algorithm by Viola and Jones. In this process, a cascade of classifiers is initialized with training data based on Haar wavelets. Said algorithm then examines the camera images for faces. If a face is found, it is marked and the coordinates of the current position are received.

This position must now be converted with respect to the projected image. This requires the position of the projection in the camera image. Said position is calculated in the beginning using a projected test image and feature detection, see FIG. 5. Using the position and size of the face, the projection and the ratio of projection image to projection in the camera image, it is then possible to calculate the coordinates at which a black circle is to be created.

```
//Position of the face
int FaceX=faces[i].x+faces[i].width*0.5;
int FaceY=faces[i].y+faces[i].height*0.5;
//Positions Projection
Point ProjectionLO=points[0][0];
Point ProjectionLU=points[0][3];
Point ProjectionRO=points[0][1];
Point Projection RU=points[0][2];
//Factor for scaling the circle
float    factHori=(float)proje.cols/((float)ProjectionRO.x-(float) ProjectionLO.x);
float    factVert=(float)proje.rows/((float)ProjectionRU.y-(float) ProjectionRO.y);
//New coordinates in projection
int FaceXnew=FaceX-ProjectionLO.x;
int FaceYnew=FaceY-ProjectionLO.y;
```

Using these coordinates, a circle is now created in the projected image, the position of which is recalculated for each individual image so as to continuously track the face and update the position in the projection. The result shows the face detection in FIG. 10.

Evaluation:

During testing of the different approaches, it has been found that in principle the objective of detecting persons in the projection, subsequently deactivating the projector and ultimately reactivating it when the person leaves the region has been met. In the feature detection selected, that is to say when searching for features, the difference image method, the structure detection and in the case of face detection, there are, however, a few limitations.

Furthermore, it was found in tests that by switching the projector on and off, automatic brightness adaptation of the webcam is very lazy and must be taken into account in the system.

Approach 1: Detecting within the Projected Image:

The AKAZE method in the projection offers the possibility of performing a feature comparison in the case of a moving image only with great outlay, because a new threshold value would have to be set for each new frame and at the same time a check would have to be performed as to whether a person is located in the projection. This would represent an enormous computational outlay, and a permanent comparison is probably difficult on account of latency. Furthermore, the AKAZE method is dependent on the image content. The features are produced with the aid of structures located in the image. If the image available has little structure or the structures occur only in a specific region, detection can also only occur there. This problem can be explained on the basis of FIG. 5. Matches in the image are found only in the lower image region (landscape), but not in the upper region (sky). A major advantage of the AKAZE method is that it is invariant with respect to brightness changes in the aircraft cabin.

The difference image method in principle also provides good results. However, this method is dependent on brightness changes. That is to say, when the light conditions in the cabin change compared to the background image that was generated in the beginning, this method no longer works. However, this background image is capable of learning and can be adapted.

One advantage of this approach is that the projector is deactivated only when the person enters the projection.

Approach 2: Detecting Outside of the Projected Image:

The objective to not dazzle the person was also met in the case of detection around the projected image in all three solution approaches. This approach furthermore offers the possibility of video playback with little outlay.

Difference Image:

The learning rate is reliable and also has a good reaction time. However, the person when standing still is calculated into the difference image and thus disappears. The attempt to bypass this involves temporally limiting the learning rate both in the switched-on and in the switched-off projection mode. This also solves the problem that the background is incorporated by calculation too "strongly" into the background image when no person passes through the image for some time, as a result of which the difference between the background with and without a person would be too great and the projector would consequently not be switched on again. Furthermore, limitations that falsify the difference image occur due to shadows cast by the person and due to brightness changes when switching the projector on and off. Brightness differences in the played-back video contents result in slight differences in the camera image, but these can be compensated. Furthermore, major brightness changes in the aircraft cabin result in the projector being switched off because the difference to the difference image becomes too great. This problem could be solved either by linking the light and projection system so that the projection system can be informed in the case of a change in light, or by an adaptation of the learning algorithm such that the latter recognizes the different light situations. Furthermore, the computational power in this method is relatively low.

Features:

The feature detection operates with less reliability than the difference image, but does provide the desired result. However, the detection is highly dependent on the structures of the person passing through the image. For example, if said person is wearing a single-colour top, significantly fewer features are found than in the case of a top carrying a logo or with a lot of structure. It is consequently difficult to find a meaningful threshold value, and it has been found that some persons are not detected. Furthermore, the dependence with respect to brightness changes is not as good as hoped.

On account of the changing brightness, new features arise in structure-rich image regions or are lost. However, as compared to the difference image, homogeneous areas remain the same. In a measurement of the features found under the conditions as in FIG. 8, around 100 features were found without person and approximately 200 with a person. This value can fluctuate for other persons. The computational power in this method is relatively high.

Structure:

Structure detection provides the desired result only with great limitations. The change between an empty image and an image with a person is not sufficiently great. The measurement of the average of the binary image of these two states gave a value of approximately 30 with a person and around 29 without a person. At values of 0 to 255, this difference is too small for reliable detection.

Approach 3: Face Detection:

In face detection, a very good result was obtained for the frontal face. The algorithm by Viola and Jones operates with great reliability and even detects the face if it is located in the projection. However, no usable training data for detecting faces in profile could be found. Blocking out image regions also operates reliably, with the result that the reproduction of the video can be continued and regions are still visible. However, the calculation is somewhat more intensive, which means that there is some latency between the real head position and the calculated position of the black circle in the projection. Therefore, if the head moves quickly, it is possible that the person is dazzled because the black circle is not moved directly to the position of the head. The resulting optical change on account of the projection in the face can result in no face being detected for a brief period of time. However, a problem in this approach arises when the projected image content contains faces. The latter would be detected and blocked without a person being located in the projection. This problem could be addressed either by additional analysis of the projected image content or by a combination with other approaches, such as, for example, the difference image.

Overview of the Results:

| Approach | Calculation outlay | Stability/ detection rate | Brightness invariance | Optimization approaches |
| --- | --- | --- | --- | --- |
| 1 within image | + + | o | o | Permanent threshold calculation Adaptive difference image |
| 2.1 Outside Difference image: | – – | + + | – | Adaptive difference image linked to illumination |
| 2.2 Outside Features | + | – | o | |
| 2.3 Outside Structure: | – – | – | o | |
| 3 Face detection | + | + | + + | Better algorithm Pre-analysis of the image material on faces Combination with difference image |

The best result would be achieved with a combination of face detection and difference image method within the projection. The face detection would only be activated thereby if a person were actually located in the projection. The difference image method used here would have to be adaptive for invariance with respect to brightness changes.

LIST OF REFERENCES

AKAZE and ORB planar tracking. (Sep. 4, 2016). Retrieved on Nov. 7, 2017 at https://gregorkovalcik.github.io/opencv_contrib/tutorial_akaze_tracking.html Alcantarilla, P. F., Nuevo, J., & Bartoli, A. (October 2012). KAZE FEATURES. Retrieved on Oct. 24, 2017 at http://robesafe.com/personal/pablo.alcantarilla/kaze.html Chris Stauffer, W. G. (1999). *Adaptive background mixture models for real-time tracking*. Cambridge.

Erhardt, A. (2008). *Einführung in die Digitale Bildverarbeitung*. Vieweg+Teubner.

*How to Use Background Subtraction Methods*. (Nov. 7, 2017). Retrieved on Nov. 8, 2017 at https://docs.opencv.org/master/d1/dc5/tutorial_background_subtraction.html Kunz, D. (2016). *Bildverarbeitung SS* 20 chapter 2016. T H Köln.

Kunz, D. (2016). *Bildverarbeitung SS* 2016 chapter 5. T H Köln.

Laws, K. I. (1980). *Rapid Texture Identification*.

Melton, B. (2015). *Presentation on theme: Segmentation Using Texture*. Retrieved on Nov. 22, 2017 at http://slideplayer.com/slide/6920161/

Viola, P., & Jones, M. (2001). *Rapid Object Detection using a Boosted Cascade of Simple*. Cambridge.

LIST OF REFERENCE SIGNS

2 Target area
4 Camera
6 Light source
8 Computer
10 Person
12 Arrow
14a,b Image
15 Image content
16 Feature
17 Vicinity
18 Region
20 Interior
22 Vehicle
24 Light
26 Beam cone
28 Monitoring section
30 Field of view
32 Camera image
40a,b Convolution mask
42 Frame

What is claimed is:

1. A method for avoiding dazzling of a person by a light source arranged in an interior of a vehicle, wherein the light source during operation emits light within a beam cone, in which:
   a camera is arranged in the interior and oriented such that at least one monitoring section of the beam cone, in which the person can enter, is located in the field of view of the camera,
   the camera records a camera image,
   using machine person detection, it is ascertained from the camera image whether at least one part of the person is located within the beam cone,
   in this case, at least the region of the beam cone in which the part of the person is located is switched to glare-free.

2. The method according to claim 1, wherein the entire beam cone is switched to glare-free if at least one part of the person is located in the beam cone.

3. The method according to claim 1, wherein the region of the beam cone is switched to glare-free by the light source for the region being switched to glare-free or switched off.

4. The method according to claim 1, wherein the beam cone is directed at a target area of the interior and the camera is oriented such that at least a partial region of the target area lies within the field of view of the camera.

5. The method according to claim 4, wherein the partial region of the target area captured by the camera is not taken into account in machine vision only with respect to image contents, produced by the light source, in the form of persons and/or movements and/or human-like image elements.

6. The method according to claim 5, wherein the partial region of the target area, captured by the camera, is not taken into account in machine vision.

7. The method according to claim 1, wherein the camera is oriented such that a vicinity of the beam cone is also located in the field of view of the camera.

8. The method according to claim 1, wherein the camera is arranged next to the light source.

9. The method according to claim 1, wherein machine vision and/or face detection and/or texture detection and/or movement detection is/are performed as part of the machine person detection.

* * * * *